United States Patent
Kwon et al.

(10) Patent No.: US 11,663,170 B2
(45) Date of Patent: May 30, 2023

(54) METHOD FOR ASSOCIATING DATA BETWEEN A PLURALITY OF BLOCKCHAIN NETWORKS AND APPARATUS THEREOF

(71) Applicant: SAMSUNG SDS CO., LTD., Seoul (KR)

(72) Inventors: Young Woon Kwon, Seoul (KR); Jung Woo Cho, Seoul (KR); Hwa Yong Oh, Seoul (KR); Han Saem Seo, Seoul (KR); Sang Won Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 432 days.

(21) Appl. No.: 16/994,782

(22) Filed: Aug. 17, 2020

(65) Prior Publication Data

US 2021/0357369 A1   Nov. 18, 2021

(30) Foreign Application Priority Data

May 14, 2020   (KR) .................. 10-2020-0057464

(51) Int. Cl.
*G06F 16/182* (2019.01)
*G06F 16/178* (2019.01)
*H04L 9/06* (2006.01)

(52) U.S. Cl.
CPC ........ *G06F 16/1837* (2019.01); *G06F 16/178* (2019.01); *H04L 9/0637* (2013.01)

(58) Field of Classification Search
CPC .............. G06F 16/1837; G06F 126/13; G06F 16/2379; G06F 16/245; G06F 16/2228

USPC ........................................... 707/827
See application file for complete search history.

(56) References Cited

U.S. PATENT DOCUMENTS

| 6,240,422 B1 * | 5/2001 | Atkins .................. G06F 16/289 707/960 |
| 10,846,096 B1 * | 11/2020 | Chung .................... G06N 20/00 |
| 2014/0101235 A1 * | 4/2014 | Smedberg ............... H04L 67/01 709/203 |
| 2016/0028699 A1 * | 1/2016 | Ambroz ................ H04L 9/3242 713/168 |
| 2017/0020815 A1 * | 1/2017 | Gutierrez ............... A61K 47/18 |
| 2017/0132257 A1 * | 5/2017 | Baird, III ............ G06F 16/2255 |
| 2017/0213209 A1 * | 7/2017 | Dillenberger ....... G06F 16/2308 |
| 2017/0278186 A1 * | 9/2017 | Creighton, IV ..... G06Q 20/401 |
| 2019/0129895 A1 * | 5/2019 | Middleton .......... G06F 16/2379 |

(Continued)

FOREIGN PATENT DOCUMENTS

KR   10-1922565 B1   11/2018

*Primary Examiner* — Shahid A Alam
(74) *Attorney, Agent, or Firm* — The PL Law Group, PLLC

(57) ABSTRACT

A method for interconnecting data between a plurality of blockchain networks according to an embodiment of the present invention includes receiving a request of an interconnecting transaction for interconnecting data between a plurality of blockchain networks, querying information of an ongoing or scheduled transaction through the plurality of blockchain networks in response to the request, and selectively determining any one of a plurality of interconnecting schemes as an interconnecting scheme of the interconnecting transaction with reference to the queried information, and performing the interconnecting transaction according to the determined interconnecting scheme.

9 Claims, 12 Drawing Sheets

(56) References Cited

U.S. PATENT DOCUMENTS

| | | | |
|---|---|---|---|
| 2020/0028947 A1* | 1/2020 | Yang | G06F 16/1824 |
| 2020/0374106 A1* | 11/2020 | Padmanabhan | G06F 16/1837 |

\* cited by examiner

1000

METHOD FOR ASSOCIATING DATA BETWEEN A PLURALITY OF BLOCKCHAIN NETWORKS AND APPARATUS THEREOF

CROSS-REFERENCE TO RELATED APPLICATIONS

This patent application claims the benefit of Korean Patent Application No. 10-2020-0057464, filed on May 14, 2020, which is hereby incorporated by reference in its entirety into this application.

BACKGROUND

1. Field

The present disclosure relates to a method for interconnecting data between a plurality of blockchain networks and apparatus thereof. More specifically, it relates to a method and apparatus for interconnecting data such that the same data is shared and recorded between different blockchain networks.

2. Description of the Related Art

Blockchain is a data management technology, in which continuously increasing data are recorded in blocks of a specific unit and each blockchain node constituting a peer-to-peer network manages blocks as a data structure in the form of a chain. Blockchain can ensure the integrity and security of transactions through a consensus process, in which all blockchain nodes belonging to the network verify and record all transactions.

Blockchain networks are generally configured to verify and record data within their own networks, independent of other blockchain networks. For example, as shown in FIG. 1, A blockchain network 1 can share data only between nodes belonging to its network, and in principle, it is difficult to exchange and share data between A blockchain network 1 with B blockchain networks 2.

Therefore, in order to record certain data in a plurality of blockchain networks, it was necessary to respectively record data in a separate blockchain network through completely separate recording actions. However, in this method, if data recording succeeds in one blockchain network and data recording fails in another blockchain network, data inconsistencies between blockchain networks cannot be avoided. Further, since data is recorded through completely separate actions, data may be significantly different at the time when data is recorded in individual blockchain networks, and thus there was a problem that data may be inconsistent for a considerable amount of time even if data is successfully recorded in the blockchain network.

SUMMARY

The technical problem to be solved through some embodiments of the present disclosure is to provide a method and apparatus for interconnecting data between a plurality of blockchain networks so that the same data is recorded and managed between different blockchain networks.

Another technical problem to be solved through some embodiments of the present disclosure is to provide a method and apparatus for interconnecting data between a plurality of blockchain networks for minimizing the problem that the transaction processing speed of other blockchain networks decreases together as it depends on the blockchain network that has the slowest transaction processing speed among the interconnecting target blockchain networks.

Another technical problem to be solved through some embodiments of the present disclosure is to provide a method and apparatus for interconnecting data between a plurality of blockchain networks capable of maximizing the performance of each blockchain network by determining and applying an optimal interconnecting scheme when performing an interconnecting transaction.

The technical problems of the present disclosure are not limited to the technical problems mentioned above, and other technical problems not mentioned will be clearly understood by those skilled in the art from the description below.

According to an embodiment of the present disclosure, a method for interconnecting data between a plurality of blockchain networks comprises receiving a request of an interconnecting transaction for interconnecting data between a plurality of blockchain networks, querying information of an ongoing or scheduled transaction through the plurality of blockchain networks in response to the request, and selectively determining any one of a plurality of interconnecting schemes as an interconnecting scheme of the interconnecting transaction with reference to the queried information, and performing the interconnecting transaction according to the determined interconnecting scheme.

According to another embodiment of the present disclosure, an apparatus for interconnecting data between a plurality of blockchain networks comprises a processor, a memory for loading a computer program executed by the processor, and a storage for storing the computer program, wherein the computer program comprises instructions to perform operations comprising receiving a request of an interconnecting transaction for interconnecting data between a plurality of blockchain networks, querying information of an ongoing or scheduled transaction of the plurality of blockchain networks in response to the request, and selectively determining any one of a plurality of interconnecting schemes as an interconnecting scheme of the interconnecting transaction with reference to the queried information, and performing the interconnecting transaction according to the determined interconnecting scheme.

According to another embodiment of the present disclosure, a computer program combined with a computing device performs a method of interconnecting data between a plurality of blockchain networks, wherein the computer program is stored in a computer readable recording medium to perform operations comprising receiving a request of an interconnecting transaction for interconnecting data between a plurality of blockchain networks, querying information of an ongoing or scheduled transaction of the plurality of blockchain networks in response to the request, and selectively determining any one of a plurality of interconnecting schemes as an interconnecting scheme of the interconnecting transaction with reference to the queried information, and performing the interconnecting transaction according to the determined interconnecting scheme.

DETAILED DESCRIPTION

Figure 1:
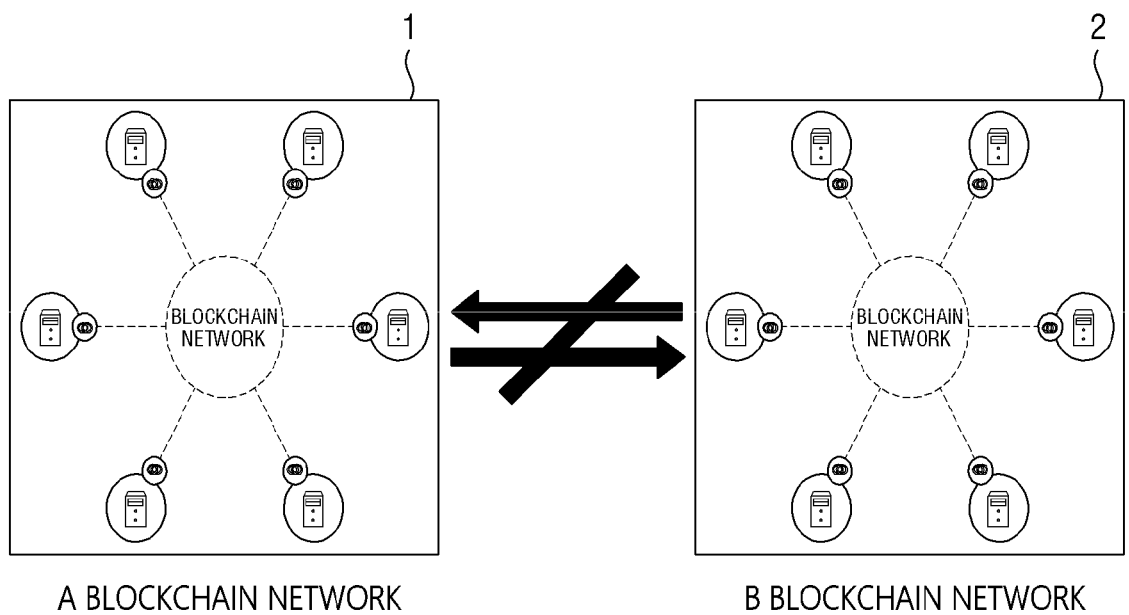
FIG. 1 is a conceptual diagram for describing a problem, in which data interconnecting between different blockchain networks is difficult in a conventional blockchain network environment.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A. B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

Figure 2:
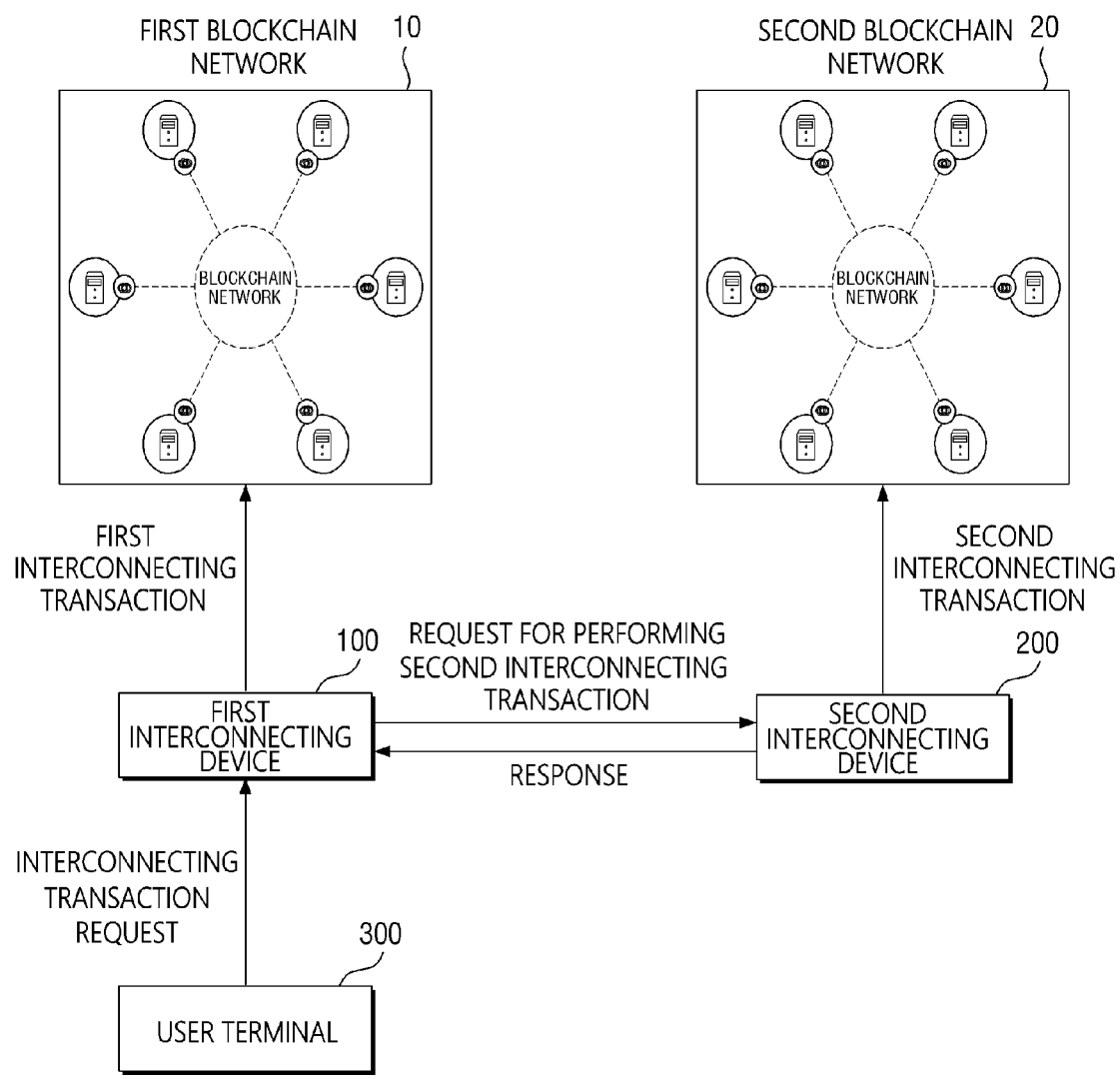
FIG. 2 is an exemplary configuration diagram illustrating a system for interconnecting data between a plurality of blockchain networks according to embodiments of the present disclosure.

FIG. 2 is an exemplary configuration diagram for describing a system environment, in which a method of interconnecting data between a plurality of blockchain networks according to some embodiments of the present disclosure operates. Referring to FIG. 2, the system environment 1000 comprises a first blockchain network 10, a second blockchain network 20, a first interconnecting device 100 connected to the first blockchain network 10, and a second interconnecting device 200 connected to the second blockchain network 20 and a user terminal 300 communicating with the first interconnecting device 100.

In the present disclosure, the meaning of interconnecting data between a plurality of blockchain networks may be that specific data is identically recorded in each of the plurality of blockchain networks, but is not limited thereto.

The first blockchain network 10 is any blockchain network formed by a plurality of blockchain nodes. The first blockchain network 10 may be a network that verifies its consistency through distributed consensus of blockchain nodes with respect to transaction requests, and records transaction data in newly generated blocks according to the verified results, but is not limited thereto.

The second blockchain network 20 is also any blockchain network formed by a plurality of blockchain nodes. The second blockchain network 20 may also be a network that verifies its consistency through distributed consensus of blockchain nodes with respect to transaction requests, and records transaction data in newly generated blocks according to the verified results, but is not limited thereto.

As an embodiment, the first blockchain network 10 and the second blockchain network 20 may be different types of blockchain networks. For example, the first blockchain network 10 and the second blockchain network 20 may be networks having different distributed consensus algorithms, transaction architectures, or block generation algorithms. For example, the first blockchain network 10 may be a Hyperledger Fabric network, and the second blockchain network 20 may be an Ethereum network, but is not limited thereto.

In the present disclosure, in order to interconnect data between a plurality of blockchain networks 10 and 20 (that is, to ensure that the same data is commonly recorded), an interconnecting transaction of recording the same data for each of the blockchain networks 10 and 20 is performed. Among those interconnecting transactions, what performed for the first blockchain network 10 is referred to as a first interconnecting transaction, and what performed for the second blockchain network 20 is referred to as a second interconnecting transaction.

The first interconnecting device 100 is a device that is connected to the first blockchain network 10 and performs a first interconnecting transaction with respect to the first blockchain network 10. The first interconnecting transaction means a transaction that records data through the first blockchain network 10 as a part of the interconnecting transaction requested from the user terminal 300.

The first interconnecting device 100 performs a series of operations to record data by interconnecting with the first blockchain network 10 and the second blockchain network 20 in response to the interconnecting transaction request received from the user terminal 300. To this end, the first interconnecting device 100 directly performs the first interconnecting transaction for recording data through the first blockchain network 10, and request the second interconnecting transaction to record the same data through the second blockchain network 20 to the second interconnecting device 200.

The second interconnecting device 200 is a device that is connected to the second blockchain network 20 and performs a second interconnecting transaction for the second blockchain network 20. The second interconnecting transaction means a transaction that records data through the second blockchain network 20 as a part of the interconnecting transaction requested from the user terminal 300.

The second interconnecting device 200 performs a second interconnecting transaction for recording data through the second blockchain network 20 in response to the request for performing the second interconnecting transaction from the first interconnecting device 100, and replies the result of performing the second interconnecting transaction as a response to the first interconnecting device 100.

Meanwhile, although it is illustrated that the first interconnecting device 100 and the second interconnecting device 200 are configured as separate devices, the scope of the present disclosure is not limited thereto. For example, the first interconnecting device 100 and the second interconnecting device 200 are configured as one device, and the first interconnecting transaction for the first blockchain network 10 and the second interconnecting transaction for the second blockchain network 20 may be executed together through the one device.

The user terminal 300 is a device that receives an interconnecting transaction service from the first interconnecting device 100. The user terminal 300 may be implemented as a mobile phone, a smart phone, a laptop, a desktop, a server, or a workstation, but is not limited thereto. The user terminal 300 and the first interconnecting device 100 may communicate through a network. Here, the network can be implemented as any kind of a wired/wireless network, such as a local area network (LAN), a wide area network (WAN), a mobile radio communication network, or a wireless broadband internet (Wibro).

Figure 3:
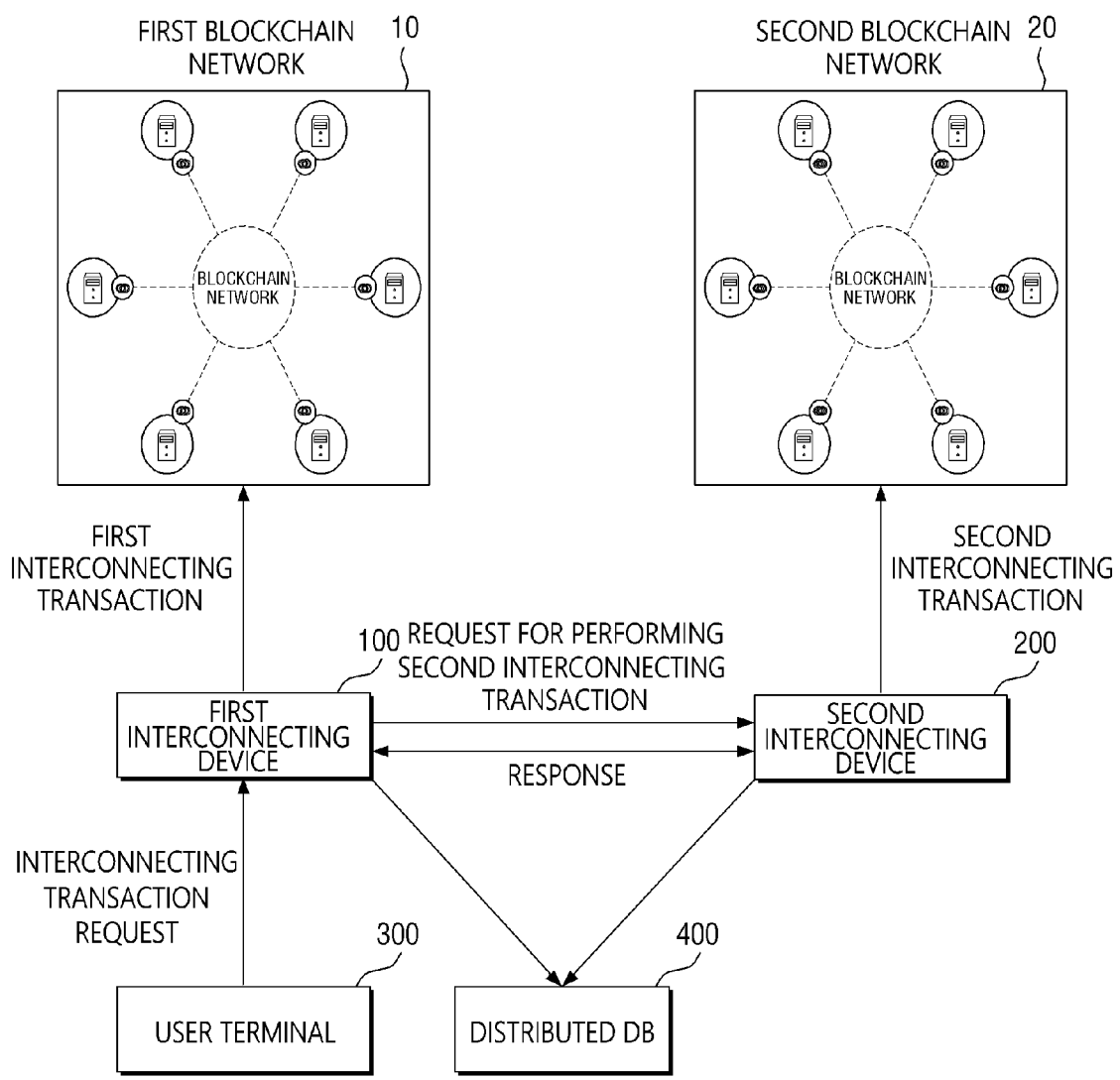
FIG. 3 is an exemplary configuration diagram illustrating an embodiment, in which a distributed database is added to the embodiment of FIG. 2.

FIG. 3 is an exemplary configuration diagram for describing an embodiment, in which the distributed database 400 is added to the embodiment of FIG. 2. The illustrated system environment 1010 of FIG. 3 is similar in most configuration to the system environment 1000 of FIG. 2. However, it is different in that a distributed database 400 that communicates with the first interconnecting device 100 and the second interconnecting device 200 is further included.

The distributed database 400 is a device that stores transaction information of a plurality of blockchain networks 10 and 20. The transaction information stored by the distributed database 400 may include various information related to ongoing or scheduled transactions through a plurality of blockchain networks 10 and 20. For example, the transaction information may include a chain ID or a channel ID, a chain code ID or a smart contract ID, timestamps, statuses, etc. of ongoing or scheduled transactions.

As an embodiment, the distributed database 400 may further include a transaction queue indicating a queue of transactions scheduled to proceed through a plurality of blockchain networks 10 and 20.

In addition, the distributed database 400 may further store backups of data recorded in the plurality of blockchain networks 10 and 20. When the data recorded in the plurality of blockchain networks 10 and 20 is important data, this preserves the original data even when the first blockchain network 10 or the second blockchain network 20 becomes disabled.

Further, if it is necessary to verify the integrity or authenticity of the data recorded in the blockchain networks 10, 20, the distributed database 400 uses the backup data stored in the distributed database 400 to check its integrity. And, when the first interconnecting device 100 and the second interconnecting device 200 temporarily need data storage space, the storage space of the distributed database 400 can be provided as temporary storage means for the first interconnecting device 100 and the second interconnecting device. And, it can also be utilized for other various purposes.

As an embodiment, the distributed database 400 may be a distributed key-value store such as ETCD.

As an embodiment, the distributed database 400 may be provided for Crash Fault Tolerance (CFT). CFT is an operation that enables the rest of the system to service even if a node has a problem caused by an abnormal collision in the distributed system, and the distributed database 400 may be provided as a component of such distributed system.

Hereinafter, various embodiments of interconnecting data between a plurality of blockchain networks based on the system environments 1000 and 1010 described so far will be described in detail.

Figure 4:
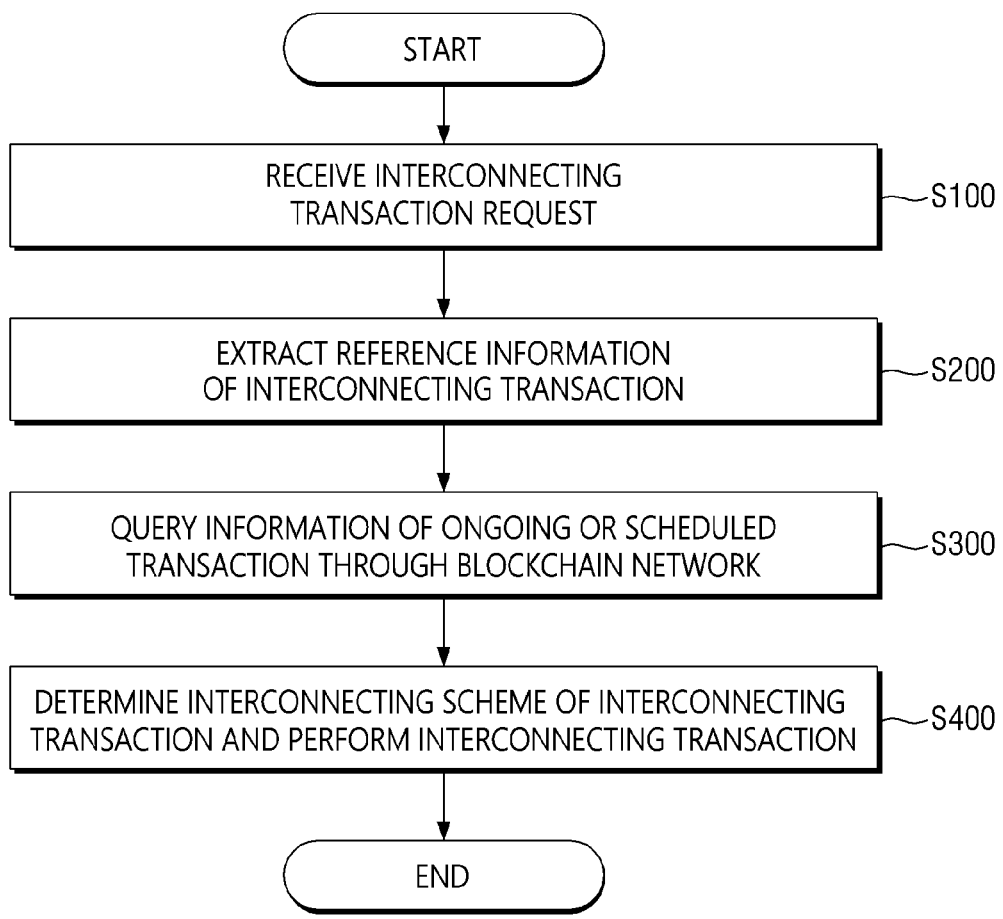
FIG. 4 is a flowchart illustrating a method of interconnecting data between a plurality of blockchain networks according to embodiments of the present disclosure.

FIG. 4 is a flowchart illustrating a method of interconnecting data between a plurality of blockchain networks according to embodiments of the present disclosure. For convenience of understanding, it is assumed that a method of interconnecting data between a plurality of blockchain networks according to the present embodiments is performed in the system environments 1000 and 1010 illustrated in FIG. 2 or 3. Further, when the subject of each step is omitted in the following embodiments, it is assumed that each step is performed by the first interconnecting device 100 described above.

In step S100, the first interconnecting device 100 receives an interconnecting transaction request from the user terminal 300. The interconnecting transaction request is a request to perform an interconnecting transaction for interconnecting data between a plurality of blockchain networks 10 and 20, and may be a request to commonly record specific data in a plurality of blockchain networks 10 and 20.

In step S200, the first interconnecting device 100 extracts reference information of the interconnecting transaction from the interconnecting transaction request or from data provided therewith. In this case, the extracted reference information may include metadata of an interconnecting transaction, and may include a chain ID, channel ID, a chain code ID or smart contract ID of the interconnecting transaction.

In step S300, the first interconnecting device 100 queries information of ongoing or scheduled transactions through a plurality of blockchain networks 10 and 20. As an embodiment, the first interconnecting device 100 may query the information of the ongoing or scheduled transactions through a separately implemented distributed database 400, wherein the distributed database 400 may search or extract the information of the transactions registered in its transaction queue and provide it to the first interconnecting device 100 as information of the ongoing or scheduled transactions.

In step S400, the first interconnecting device 100 refers to the previously queried information, determines an interconnecting scheme of the interconnecting transaction among the asynchronous scheme and the synchronous scheme, and performs the interconnecting transaction according to the determined interconnecting scheme.

The asynchronous scheme is a scheme, in which interconnecting transactions for each blockchain network are performed independently regardless of the state of other blockchain networks. When performing an interconnecting transaction in an asynchronous scheme, the concurrency between the first interconnecting transaction for the first blockchain network 10 and the second interconnecting transaction for the second blockchain network 20 is not guaranteed, and the first interconnecting device independently performs and completes the first interconnecting transaction regardless of the progress state of the second interconnecting transaction. That is, in the asynchronous scheme, the first interconnecting device 100 initiates the first interconnecting transaction regardless of the state of the second blockchain network 20 and the second interconnecting device 200 as long as the first blockchain network 10 is in the state that can perform a new transaction, and can proceed with and complete the first interconnecting transaction even before the second interconnecting transaction for the second blockchain network 20 is not completed or even started.

The synchronous scheme is a scheme, in which interconnecting transactions for each of the plurality of blockchain networks 10 and 20, is performed in synchronization with each other. When performing the interconnecting transaction in a synchronous scheme, since the first interconnecting transaction for the first blockchain network 10 and the second interconnecting transaction for the second blockchain network 20 are performed in parallel with each other, the concurrency between the first interconnecting transaction and the second interconnecting transaction is guaranteed, and the first interconnecting device 100 proceeds and completes the first interconnecting transaction according to the progress state of the second interconnecting transaction. In the synchronous scheme, the first interconnecting device 100 does not immediately initiate the first interconnecting transaction even when the first blockchain network 10 can perform a new transaction, and waits to initiate the first interconnecting transaction until the second blockchain network 20 becomes the state that can perform a new transaction. And, it proceeds and completes the first interconnecting transaction in accordance with the progress state of the second interconnecting transaction for the second blockchain network 20.

The synchronous scheme has the advantage of being able to grasp the interconnecting status more intuitively because interconnecting transactions are progressed simultaneously for all blockchain networks, but it has some disadvantages. First, in the synchronous scheme, since interconnecting transactions for each of a plurality of blockchain networks are simultaneously progressed, if some of the blockchain networks are not in a ready state (i.e., a state, in which an interconnecting transaction can be performed), there is a problem in that the interconnecting transactions cannot be progressed for all blockchain networks even if the remaining blockchain networks are in a ready state, and it must wait indefinitely until all blockchain networks become a ready state. Second, in the synchronous scheme, since the individual interconnecting transactions for each blockchain network are sequentially performed by aligning the progress steps with each other, there is a problem in that the processing speed of the entire blockchain network depends on the processing speed of the blockchain network with the lowest processing speed. That is, even if the processing speed of the first blockchain network 10 is significantly faster, and if the processing speed of the second blockchain network 20 is slow, the first blockchain network, as a result, does not exert its maximum performance and process the interconnecting transaction at the processing speed of the second blockchain network 20 with low performance (i.e., processing speed is slow) since the interconnecting transaction is progressed in the first blockchain network 10 in accordance with the progress state of the second blockchain network 20.

On the other hand, in the asynchronous scheme, since the interconnecting transaction for each blockchain network is progressed individually, the problem of the synchronous scheme can be solved. For example, in the asynchronous scheme, a blockchain network with high processing speed processes an interconnecting transaction assigned to itself by maximizing its processing performance without having to wait for the ready state or processing stage of other blockchain networks. Therefore, the problem of the synchronous scheme, that is, the interconnecting transaction of each blockchain network can be initiated only after all blockchain networks are ready, and the speed of the entire blockchain network depends on the speed of the blockchain network having with the lowest performance do not appear in the asynchronous scheme.

However, the asynchronous scheme has a disadvantage that the applicable situation is limited. For example, it may be difficult to apply an asynchronous scheme in the case that the sequential order between other ongoing or scheduled transactions and interconnecting transactions in the blockchain network need to be guaranteed. Due to the characteristic of the blockchain network, data continuity must be guaranteed between the generated blocks. For this reason, if there is an advanced transaction related to the interconnecting transaction and the interconnecting transaction proceeds first by ignoring it, an error may occur in the recorded data. Therefore, in order to guarantee data continuity between blocks, the asynchronous scheme can be limitedly applied only when there is no transaction related to interconnecting transactions among ongoing or scheduled transactions in the blockchain networks 10 and 20.

In step S400 of FIG. 4, it is determined whether the asynchronous scheme can be applied to the interconnecting transaction by referring to information of ongoing or scheduled transactions of the plurality of blockchain networks 10 and 20, and if the asynchronous scheme can be applied, the asynchronous scheme is determined as the interconnecting scheme and the interconnecting transaction is performed, otherwise the synchronous scheme is determined as the interconnecting scheme and the interconnecting transaction is performed.

According to this method, it is possible to maximize the performance of each blockchain network by determining and applying the optimal interconnecting scheme when performing interconnecting transaction, and it is possible to minimize the problems of the synchronous scheme.

Figure 5:
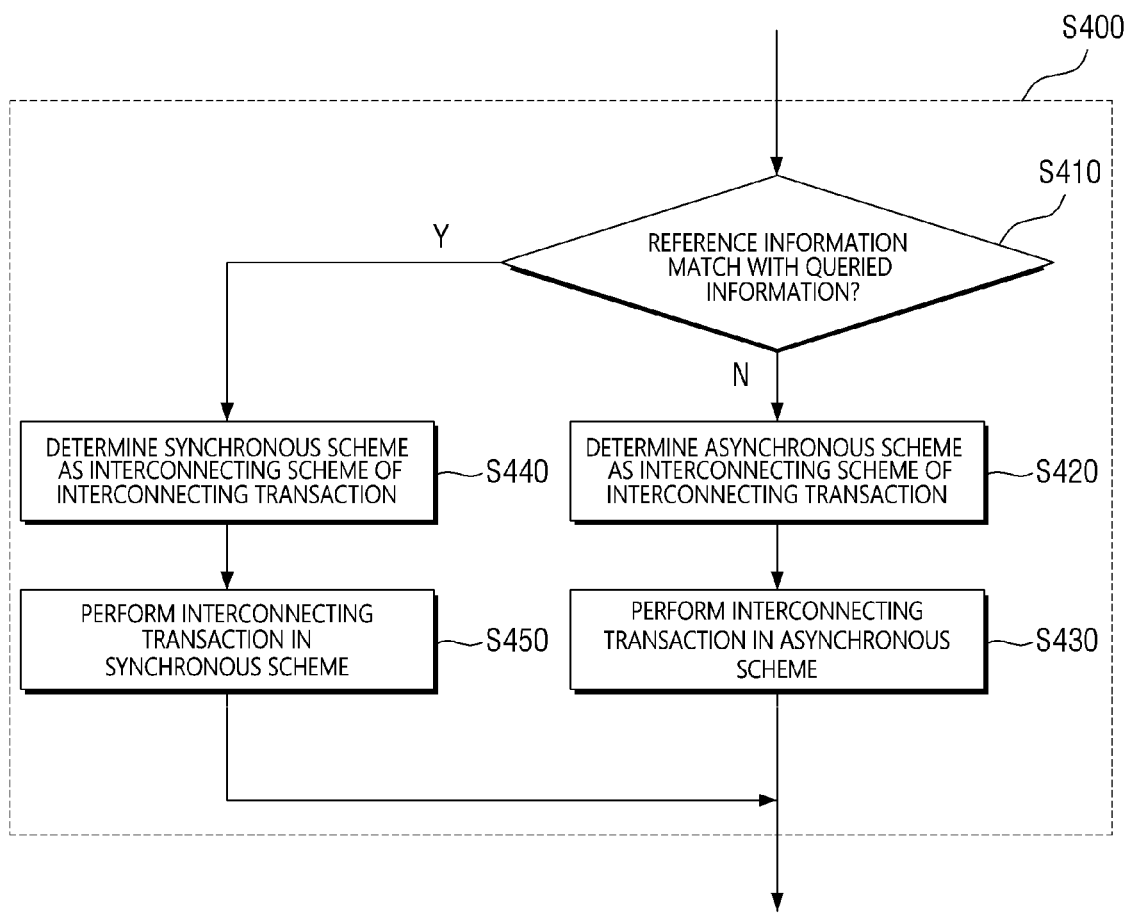
FIG. 5 is a flowchart illustrating an embodiment, in which the step S400 of performing the interconnecting transaction of FIG. 4 is further specified.

FIG. 5 is a flowchart illustrating an embodiment, in which the step S400 of performing the interconnecting transaction of FIG. 4 is further specified. It will be described below with reference to the drawings.

In step S410, the first interconnecting device 100 determines whether the reference information and the queried information match each other. At this time, the reference information includes the chain ID or chain code ID of the interconnecting transaction, and the queried information may include the chain ID or chain code ID of the ongoing or scheduled transaction of the plurality of blockchain networks 10, 20.

In this case, when the chain ID and chain code ID of the interconnecting transaction and the chain ID and chain code ID of the ongoing or scheduled transaction previously queried coincide, respectively, the first interconnecting device 100 can determine that the reference information and the queried information match each other. Since transactions, in which the chain ID and chain code ID coincide, are likely to record consecutive data from each other, it is necessary to guarantee the execution order between such transactions.

If the reference information and the queried information do not match each other, this embodiment proceeds to step S420. Otherwise, this embodiment proceeds to step S440.

On the other hand, as an embodiment, the first interconnecting device 100 may determine that the reference information and the queried information match each other even if only one of the chain ID or chain code ID of an interconnecting transaction and an ongoing or scheduled transaction coincides. In principle, if any one of the chain ID and the chain code ID is different between transactions, it is common that there is no data relevancy between each other, but depending on the type of the blockchain network, there may be a case of affecting each other even if only one of the chain ID and chain code ID coincides. And thus, it is determined that the reference information and the queried information match each other even if only one of the chain ID and the chain code ID coincides.

Meanwhile, the chain ID or chain code ID, which is a term used herein, may be called a different name depending on the blockchain network. For example, the chain ID may be called the channel ID and the chain code ID may be called the smart contract ID, or mixed it.

In step S420, the first interconnecting device 100 determines that an interconnecting scheme of the interconnecting transaction is the asynchronous scheme. Since this is a case that the reference information and the queried information do not match each other, even if the interconnecting transaction is performed in the asynchronous scheme, there is no collision with other ongoing and scheduled transactions. Therefore, since it corresponds to a case where an asynchronous scheme can be applied, the first interconnecting device 100 determines that the interconnecting scheme is an asynchronous scheme.

In step S430, the first interconnecting device 100 applies an asynchronous scheme to perform an interconnecting transaction. The detailed steps of the interconnecting transaction according to the asynchronous scheme will be described in detail in FIG. 6, and thus a description thereof will be omitted here.

In step S440, the first interconnecting device 100 determines that the interconnecting scheme of the interconnecting transaction is a synchronous scheme. Since this is a case that the reference information and the queried information match each other, if an interconnecting transaction is performed in an asynchronous scheme, a collision with other ongoing or scheduled transactions may occur. Therefore, since it corresponds to a case where the asynchronous scheme is not applicable, the first interconnecting device 100 determines that the interconnecting scheme is a synchronous scheme.

In step S450, the first interconnecting device 100 applies a synchronous scheme to perform an interconnecting transaction. The detailed steps of the interconnecting transaction according to the synchronous scheme will be described in detail in FIGS. 7 and 8, and thus descriptions thereof will be omitted here.

Figure 6:
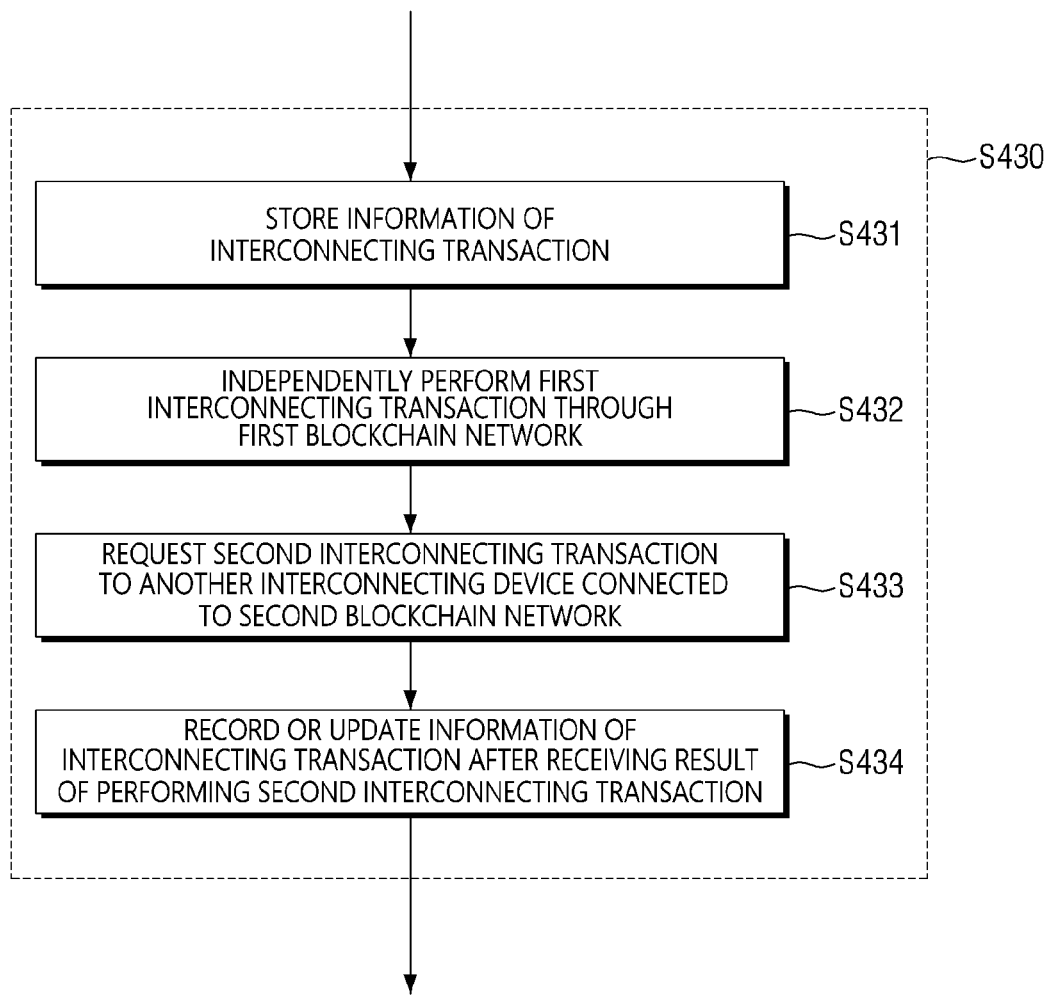
FIG. 6 is a flowchart illustrating an embodiment, in which step S430 of performing an interconnecting transaction in the asynchronous scheme of FIG. 5 is specified.

FIG. 6 is a flowchart illustrating an embodiment, in which step S430 of performing an interconnecting transaction in the asynchronous scheme of FIG. 5 is specified.

In step S431, the first interconnecting device 100 stores the requested interconnecting transaction information. As an embodiment, the first interconnecting device 100 may store information of the interconnecting transaction in a separate distributed database 400. The stored interconnecting transaction information may include metadata such as the chain ID of the interconnecting transaction, the chain code ID, the name or identifier of the blockchain network to be interconnected, the time stamp related to the interconnecting transaction, and the transaction ID, and a backup of the data to be interconnected with a plurality of blockchain networks 10, 20.

In step S432, the first interconnecting device 100 independently performs the first interconnecting transaction through the first blockchain network 10. The first interconnecting device 100 checks the ready state of the first blockchain network 10 and, when ready to perform a new transaction, generates and proceeds with the first interconnecting transaction.

In step S433, the first interconnecting device 100 requests the second interconnecting device 20 connected to the second blockchain network 20 to perform the second interconnecting transaction. In response to the request, the second interconnecting device 200, similar to the first interconnecting device 100, checks the ready state of the second blockchain network 20 and, when ready to perform a new transaction, generates and proceeds with the second interconnecting transaction.

In step S434, the first interconnecting device, after receiving the result of performing the second interconnecting transaction from the second interconnecting device 200, newly records the information of the interconnecting transaction or update the information of the interconnecting transaction stored in step S431 based on the result of the second interconnecting transaction and the result of the first interconnecting transaction performed by itself. For example, when the first interconnecting transaction and the second interconnecting transaction are successfully completed, information indicating that the requested interconnecting transaction is successfully completed may be recorded or updated as information of the interconnecting transaction.

Figure 7:
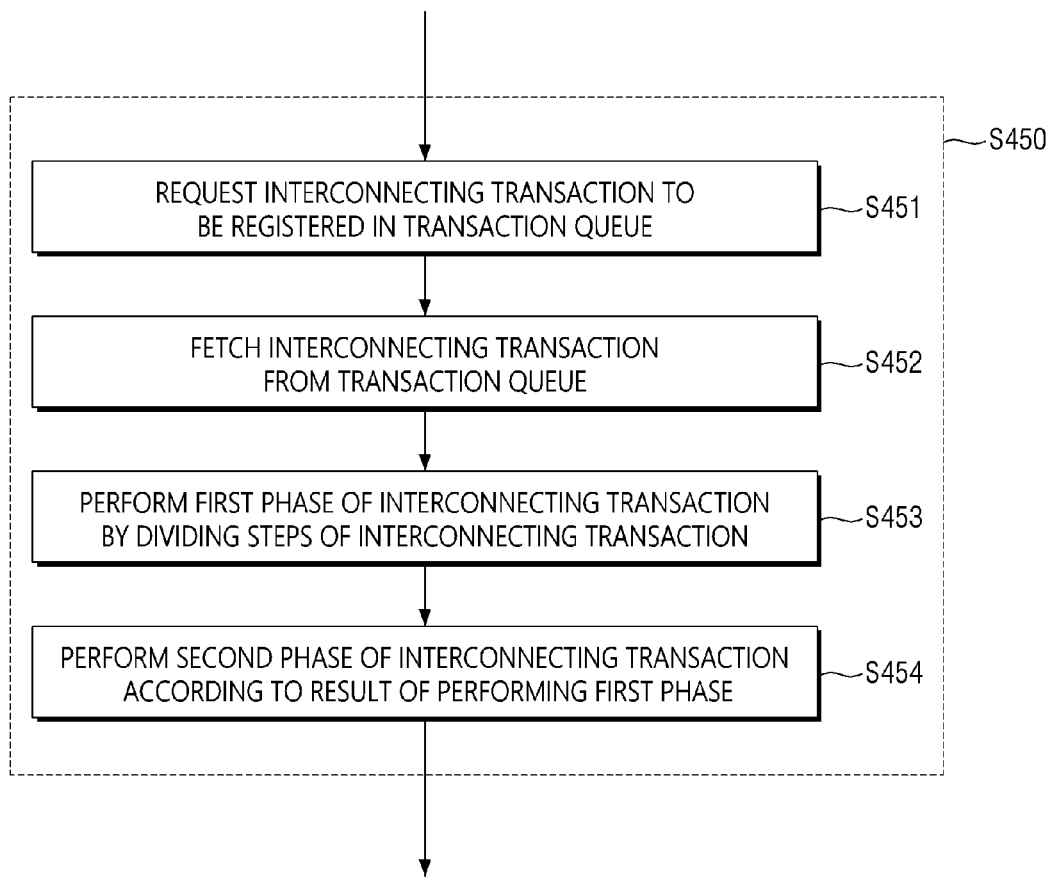
FIG. 7 is a flowchart illustrating an embodiment, in which step S450 of performing an interconnecting transaction in the synchronous scheme of FIG. 5 is specified.

FIG. 7 is a flowchart illustrating an embodiment, in which step S450 of performing an interconnecting transaction in the synchronous scheme of FIG. 5 is specified.

In step S451, the first interconnecting device 100 registers the interconnecting transaction in the transaction queue without immediately performing the interconnecting transaction. At this time, when the transaction queue is in the distributed database 400, the first interconnecting device 100 requests the distributed database 40 to register the interconnecting transaction in the transaction queue.

Since this embodiment performs interconnecting transactions in a synchronous scheme, it is necessary to guarantee execution order with other ongoing or scheduled transactions. Therefore, the first interconnecting device 100 does not immediately initiate the interconnecting transaction, and registers the interconnecting transaction in the transaction queue first.

In step S452, the first interconnecting device 100 fetches the previously registered interconnecting transaction from the transaction queue. The first interconnecting device 100 periodically checks the transaction queue and fetches and executes the transaction of the earliest sequence order. As time passes and the previously registered interconnecting transaction comes to the earliest sequence order, the first interconnecting device 100 fetches it and initiates an interconnecting transaction.

Thereafter, the first interconnecting device 100 performs interconnecting transactions in a synchronous scheme with respect to each of the plurality of blockchain networks 10, 20 together with the other interconnecting devices 200, and proceeds with and completes the first interconnecting transaction according to the progress step of the second interconnecting transaction.

In more detail, in step S453, the first interconnecting device 100 divides the steps of the interconnecting transaction to perform a first phase of the interconnecting transaction. In the synchronous scheme, since the interconnecting transactions of each blockchain network 10, 20, that is, the first interconnecting transaction and the second interconnecting transaction are synchronized and performed simultaneously, in order to guarantee this concurrency, the first interconnecting device 100 can proceed and complete an interconnecting transaction sequentially by dividing the interconnecting transaction into a plurality of phases, confirming that the corresponding phase is successfully completed for each blockchain network 10, 20, and proceeding to the next phase.

Figure 8:
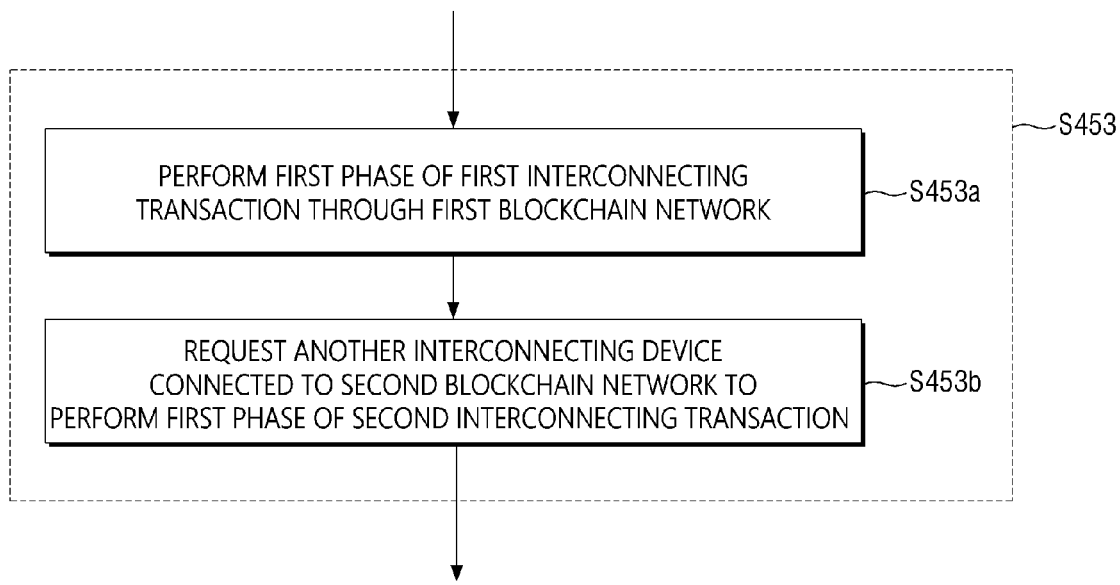
FIG. 8 is a flowchart illustrating an embodiment, in which step S453 of performing the first phase of FIG. 7 is specified.

This will be described in more detail with reference to FIG. 8. FIG. 8 is a flowchart illustrating an embodiment, in which step S453 of performing the first phase of FIG. 7 is specified.

In step S453a, the first interconnecting device 100 divides the first interconnecting transaction into a plurality of steps through the first blockchain network 10 and performs the first step among them.

In step S453b, the first interconnecting device 100 requests the second interconnecting device 200 connected to the second blockchain network 20 to perform the first step of the interconnecting transaction. The second interconnecting device 200 divides the second interconnecting transaction into a plurality of steps in response to the request, and performs the first step among them.

The first interconnecting device 100 receives the result of performing the first step of the second interconnecting transaction from the second interconnecting device 200, and if both the first step of the first interconnecting transaction and the first step of the second interconnecting transaction are successfully completed, processes it as that the first phase of the interconnecting transaction is completed.

Meanwhile, although the first step of the first interconnecting transaction and the first step of the second interconnecting transaction constitute the first phase of the interconnecting transaction, the scope of the present disclosure is not limited thereto. For example, like that the first step and the second step of the first interconnecting transaction and the first step of the second interconnecting transaction constitute the first phase of the interconnecting transaction, it is also possible that the number of steps constituting a certain phase is different for each of the first interconnecting transaction and the second interconnecting transaction.

Returning back to FIG. 7, when the first phase is completed in step S453, the first interconnecting device 100 performs a second phase of the interconnecting transaction according to the result of performing the first phase in step S454.

If the first phase succeeds previously, the first interconnecting device 100 performs the second phase of the interconnecting transaction. At this time, the second phase may be performed, similarly to the method of performing the first phase described in FIG. 8, by the first interconnecting device 100 performing the second step of the first interconnecting transaction through the first blockchain network and requesting the second interconnecting device 200 to perform the second step of the second interconnecting transaction.

On the other hand, if the first phase fails previously, the first interconnecting device 100 does not immediately perform the second phase. The first interconnecting device 100 may wait for success by retrying the first phase, and then perform the second phase, or determine that the interconnecting transaction failed due to the failure of the first phase, and terminate the embodiment while not performing the second phase.

Hereinafter, the method of interconnecting data between a plurality of blockchain networks according to the present disclosure described above will be further described focusing on the sequential interaction between each component 10, 20, 100, 200, 300, 400 from the perspective of the entire system 1010.

Figure 9:
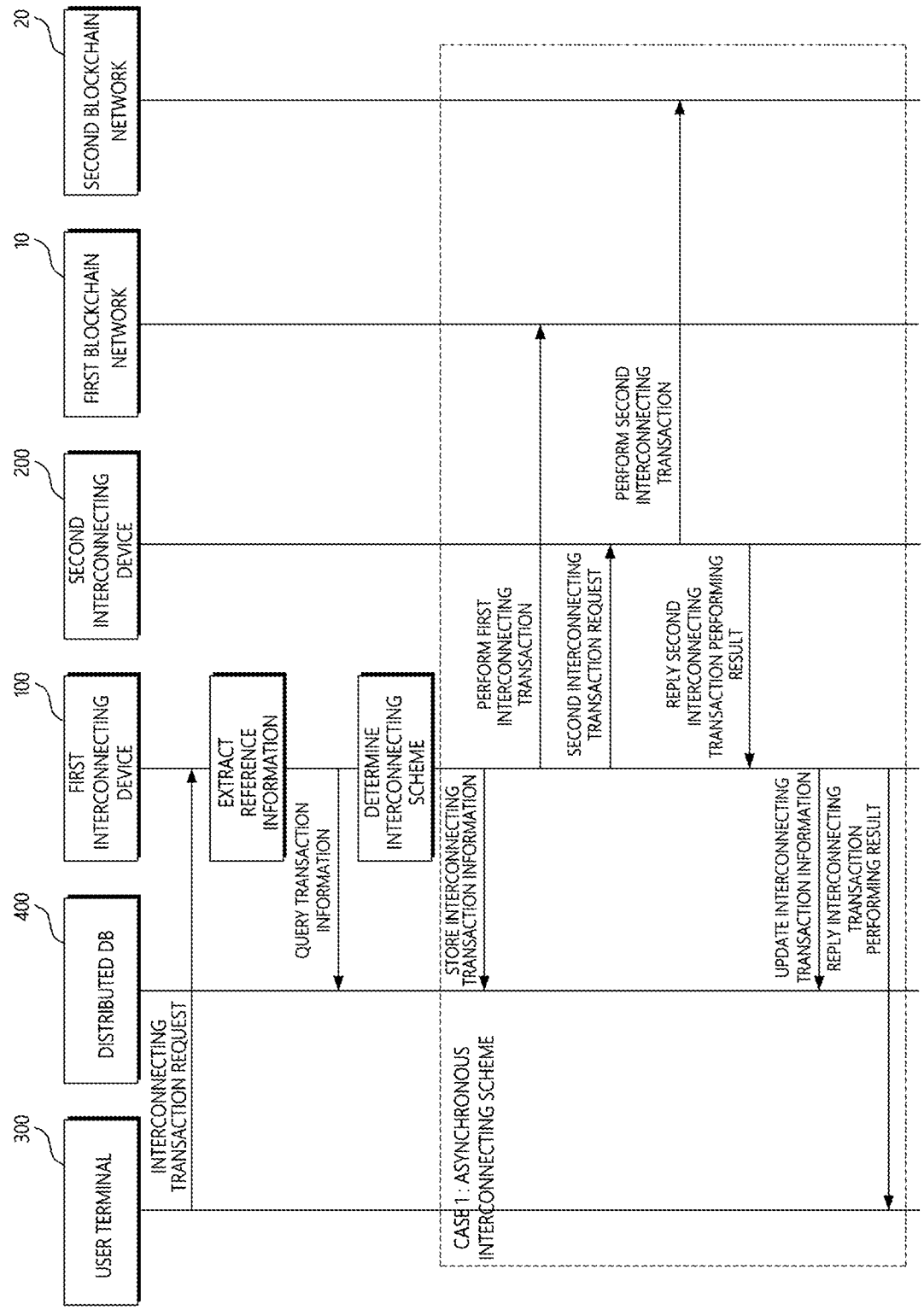
FIG. 9 is a diagram illustrating a series of sequential flows of interconnecting data between a plurality of blockchain networks according to an asynchronous interconnecting scheme.

FIG. 9 is a diagram illustrating a series of sequential flows of interconnecting data between a plurality of blockchain networks according to an asynchronous interconnecting scheme. This will be described below with reference to FIG. 9.

First, an interconnecting transaction request is transmitted from the user terminal 300 to the first interconnecting device 100. The first interconnecting device 100 extracts the reference information from the interconnecting transaction request or other data provided therewith in response to the interconnecting transaction request. The extracted reference information may include a channel ID and a channel code ID of the requested interconnecting transaction.

The first interconnecting device 100 queries the ongoing of scheduled transaction information of the blockchain networks 10 and 20 through the distributed database 400 after extracting the reference information. The transaction information to be queried may include the channel ID and channel code ID of the ongoing or scheduled transactions.

The first interconnecting device 100 determines the interconnecting scheme to be applied to the interconnecting transaction by referring to the queried information. As described above, the first interconnecting device 100 compares the extracted reference information with the queried transaction information, determines whether the channel ID and the channel code ID of the interconnecting transaction and the ongoing or scheduled transactions coincide, if the channel ID and the channel code ID coincide, the interconnecting scheme is determined as a synchronous scheme, otherwise the interconnecting scheme is determined as an asynchronous scheme. Here, it is assumed that the interconnecting scheme is determined as an asynchronous scheme because the channel ID or the channel code ID does not coincide.

Thereafter, an interconnecting transaction is performed in an asynchronous interconnecting scheme.

First, the first interconnecting device 100 stores interconnecting transaction information in the distributed database 400. The stored interconnecting transaction information may include metadata of the interconnecting transaction or backup of data to be interconnected with the blockchain networks 10 and 20.

Then, the first interconnecting device 100 performs a first interconnecting transaction through the first blockchain network 10.

Then, the first interconnecting device 100 transmits a request for the second interconnecting transaction to the second interconnecting device 200.

The second interconnecting device 200 performs the second interconnecting transaction through the second blockchain network 20 in response to the request from the first interconnecting device 100, and replies the second interconnecting transaction performing result to the first interconnecting device 100.

The first interconnecting device 100 receives the second interconnecting transaction performing result, and newly records or updates the interconnecting transaction information based on the result of the second interconnecting transaction and the result of the first interconnecting transaction performed by itself.

Then, the first interconnecting device 100 replies a result of performing the interconnecting transaction to the user terminal 300.

Figure 10:
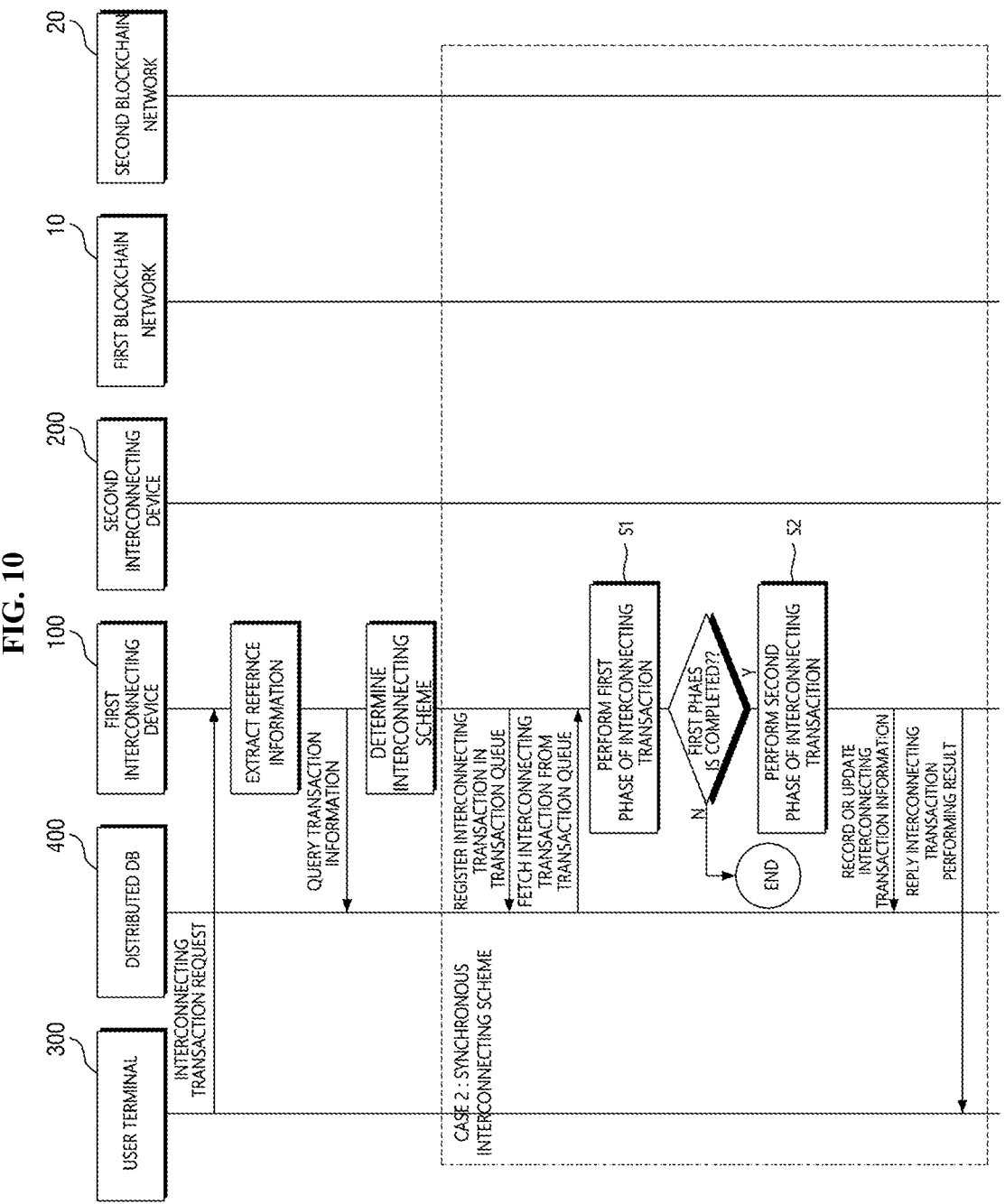
FIGS. 10 and 11 are diagrams illustrating a series of sequential flows of interconnecting data between a plurality of blockchain networks according to a synchronous interconnecting scheme.
Figure 11:
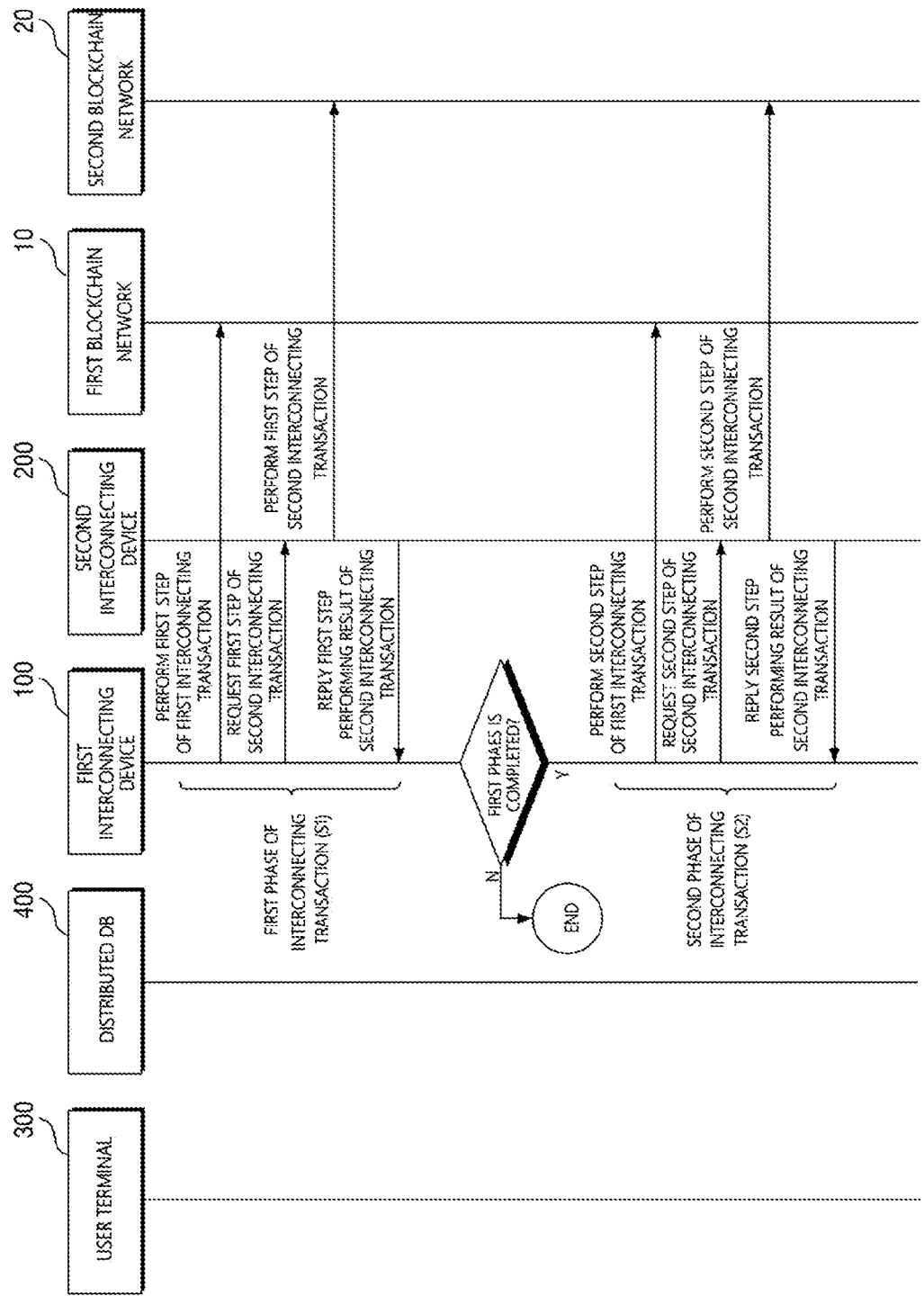

FIGS. 10 and 11 are diagrams illustrating a series of sequential flows of interconnecting data between a plurality of blockchain networks according to a synchronous interconnecting scheme. It will be described below with reference to FIGS. 10 and 11.

As in the embodiment of FIG. 9, the first interconnecting device 100 receives the interconnecting transaction request from the user terminal 300, extracts the reference information in response to the interconnecting transaction request, and then queries the ongoing or scheduled transaction information of the blockchain networks 10, 20 through the distributed database 400. Then, the first interconnecting device 100 determines the interconnecting scheme to be applied to the interconnecting transaction by referring to the queried information. However, it is assumed here that, unlike the embodiment of FIG. 9, the interconnecting method is determined as a synchronous scheme because the channel ID and the channel code ID coincide.

Thereafter, an interconnecting transaction is performed in the synchronous interconnecting scheme.

First, the first interconnecting device 100 registers the interconnecting transaction in the transaction queue of the distributed database 400 without immediately initiating the interconnecting transaction.

Thereafter, when the registered interconnecting transaction is positioned at the earliest sequence order in the transaction queue, the first interconnecting device 100 fetches the interconnecting transaction from the transaction queue.

Then, the first interconnecting device 100 divides the steps of the interconnecting transaction, and performs the first phase of the interconnecting transaction (S1).

Then, the first interconnecting device 100 determines whether the first phase is successfully completed, and if the first phase is not normally completed, ends without further proceeding with the interconnecting transaction, and if the first phase is successfully completed, continues to perform the second phase of the interconnecting transaction (S2).

Then, the first interconnecting device 100 newly records or updates the interconnecting transaction information in the distributed database 400 based on the result of performing the interconnecting transaction.

Then, the first interconnecting device 100 replies a result of performing the interconnecting transaction to the user terminal 300.

FIG. 11 is a diagram for describing in more detail the first phase step (S1) of the interconnecting transaction and the second phase step (S2) of the interconnecting transaction of FIG. 10. It will be described below with reference to the drawings.

In the first phase step (S1) of the interconnection transaction, the first interconnecting device 100 performs the first step of the first interconnecting transaction through the first blockchain network 10. Then, the first interconnecting device 100 requests the second interconnecting device 200 to perform the first step of the second interconnecting transaction.

The second interconnecting device 200 performs the first step of the second interconnecting transaction through the second blockchain network 20 in response to the request from the first interconnecting device 100, and replies the first step performing result of the second interconnecting transaction to the first interconnecting device 100.

The first interconnecting device 100 determines whether the first phase is successfully completed, and if the first phase is not normally completed, ends without proceeding with the interconnecting transaction, and if the first phase is successfully completed, proceeds to the second phase of the interconnecting transaction.

In the second phase step (S2) of the interconnecting transaction, the first interconnecting device 100 performs the second step of the first interconnecting transaction through the first blockchain network 10. Then, the first interconnecting device 100 requests the second interconnecting device 200 to perform the second step of the second interconnecting transaction.

The second interconnecting device 200 performs the second step of the second interconnecting transaction through the second blockchain network 20 in response to the request from the first interconnecting device 100, and replies the second step performing result of the second interconnecting transaction to the first interconnecting device 100 to end the second phase step (S2).

Hereinafter, an exemplary computing device 500 that can implement an apparatus and a system, according to various embodiments of the present disclosure will be described with reference to FIG. 12.

Figure 12:
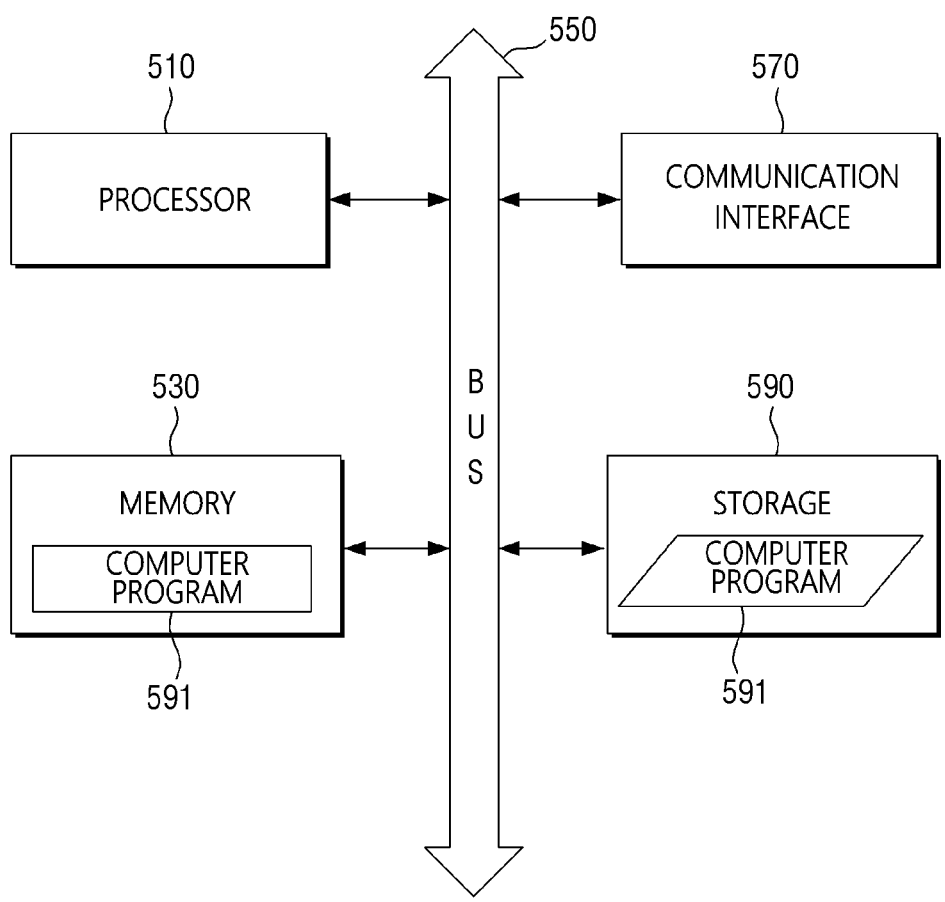
FIG. 12 is a diagram illustrating an example hardware configuration of a computing device capable of implementing methods in accordance with various embodiments of the present disclosure.

FIG. 12 is an example hardware diagram illustrating a computing device 500.

As shown in FIG. 12, the computing device 500 may include one or more processors 510, a bus 550, a communication interface 570, a memory 530, which loads a computer program 591 executed by the processors 510, and a storage 590 for storing the computer program 591. However, FIG. 12 illustrates only the components related to the embodiment of the present disclosure. Therefore, it will be appreciated by those skilled in the art that the present disclosure may further include other general purpose components in addition to the components shown in FIG. 12.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/ operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. For example, when the computer program 591 is loaded into the memory 530, the logic (or the module) as shown in FIG. 4 may be implemented on the memory 530. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to comprise a communication module well known in the art of the present disclosure.

The storage 590 can non-temporarily store one or more computer programs 591. The storage 590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure are implemented. When the computer program 591 is loaded on the memory 530, the processor 510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A method for interconnecting data between a plurality of blockchain networks, the method comprising:
receiving a request of an interconnecting transaction for interconnecting data between a plurality of blockchain networks;
querying information of an ongoing or scheduled transaction through the plurality of blockchain networks in response to the request;
selecting, with reference to the queried information, one of a plurality of interconnecting schemes as an interconnecting scheme of the interconnecting transaction; and
performing the interconnecting transaction according to the selected interconnecting scheme,
wherein the selecting comprises:
determining whether reference information of the interconnecting transaction and the queried information match with each other by comparing a chain identification (ID) or a chain code ID of the interconnecting transaction with the ongoing or scheduled transaction; and
selecting an asynchronous scheme of the plurality of interconnecting schemes as the interconnecting scheme based on a determination that the reference information and the queried information do not match with each other.

2. The method of claim 1, wherein performing the interconnecting transaction comprises:
recording information of the interconnecting transaction and independently performing a first interconnecting transaction through a first blockchain network of the plurality of blockchain networks if the selected interconnecting scheme is an asynchronous scheme.

3. The method of claim 2, wherein performing the interconnecting transaction further comprises:
requesting an interconnecting device connected to a second blockchain network of the plurality of blockchain networks to perform a second interconnecting transaction,
wherein the second interconnecting transaction is performed through the second blockchain network by the interconnecting device.

4. The method of claim 3, wherein performing the interconnecting transaction further comprises:
updating the information of the interconnecting transaction based on a performing result of the first interconnecting transaction and a performing result of the second interconnecting transaction after receiving the performing result of the second interconnecting transaction from the interconnecting device.

5. The method of claim 1, wherein performing the interconnecting transaction comprises:
requesting the interconnecting transaction to be registered in a transaction queue if the selected interconnecting scheme is not the asynchronous scheme.

6. The method of claim 5, wherein performing the interconnecting transaction further comprises:
fetching the interconnecting transaction from the transaction queue of a database;
performing a first phase of the interconnecting transaction by: performing a first step among the plurality of steps of a first interconnecting transaction through a first blockchain network of the plurality of blockchain networks; and
requesting an interconnecting device connected to a second blockchain network of the plurality of blockchain networks to perform a first step of a plurality of steps of a second interconnecting transaction corresponding to the first interconnecting transaction; and
performing a second phase of the interconnecting transaction according to a result of performing the first phase.

7. The method of claim 1, wherein information of an ongoing or scheduled transaction of the network is queried from a database; and
 the database stores information related to a transaction performed through the plurality of blockchain networks or backup information of data recorded in the plurality of blockchain networks.

8. An apparatus for interconnecting data between a plurality of blockchain networks, the apparatus comprising:
 a processor;
 a memory for loading a computer program executed by the processor; and
 a storage;
 the computer program stored in the storage, the computer program comprising instructions to perform operations comprising:
 receiving a request of an interconnecting transaction for interconnecting the data between the plurality of blockchain networks;
 querying information of an ongoing or scheduled transaction of the plurality of blockchain networks in response to the request;
 selecting an interconnecting scheme among a plurality of interconnecting schemes as the interconnecting scheme of the interconnecting transaction with reference to the queried information; and
 performing the interconnecting transaction according to the selected interconnecting scheme,
 wherein the selecting comprises:
 determining whether reference information of the interconnecting transaction and the queried information match with each other by comparing a chain Identification (ID) or a chain code ID of the interconnecting transaction with the ongoing or scheduled transaction; and
 selecting an asynchronous scheme of the plurality of interconnecting schemes as the interconnecting scheme based on a determination that the reference information and the queried information do not match with each other.

9. A computer program combined with a computing device for performing a method of interconnecting data between a plurality of blockchain networks, wherein the computer program is stored in a non-volatile computer readable recording medium to perform operations comprising:
 receiving a request of an interconnecting transaction for interconnecting data between a plurality of blockchain networks;
 querying information of an ongoing or scheduled transaction of the plurality of blockchain networks in response to the request;
 selecting, with reference to the queried information, one of a plurality of interconnecting schemes as an interconnecting scheme of the interconnecting transaction; and
 performing the interconnecting transaction according to the selected interconnecting scheme,
 wherein the selecting comprises:
 determining whether reference information of the interconnecting transaction and the queried information match with each other by comparing a chain Identification (ID) or a chain code ID of the interconnecting transaction with the ongoing or scheduled transaction; and
 selecting an asynchronous scheme of the plurality of interconnecting schemes as the interconnecting scheme based on a determination that the reference information and the queried information do not match with each other.

* * * * *